United States Patent
Kitahara et al.

(10) Patent No.: US 11,411,482 B2
(45) Date of Patent: Aug. 9, 2022

(54) ACTUATOR WITH TWO MAGNETIC DRIVE CIRCUITS TO VIBRATE A BODY IN TWO DIRECTIONS

(71) Applicant: NIDEC SANKYO CORPORATION, Nagano (JP)

(72) Inventors: Hiroshi Kitahara, Nagano (JP); Tadashi Takeda, Nagano (JP); Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 418 days.

(21) Appl. No.: 16/499,308

(22) PCT Filed: Mar. 23, 2018

(86) PCT No.: PCT/JP2018/011586
§ 371 (c)(1),
(2) Date: Sep. 29, 2019

(87) PCT Pub. No.: WO2018/180947
PCT Pub. Date: Oct. 4, 2018

(65) Prior Publication Data
US 2021/0194342 A1 Jun. 24, 2021

(30) Foreign Application Priority Data

Mar. 30, 2017 (JP) .............................. JP2017-068657

(51) Int. Cl.
*H02K 33/18* (2006.01)
*B06B 1/04* (2006.01)
*H02K 33/12* (2006.01)

(52) U.S. Cl.
CPC ............. *H02K 33/18* (2013.01); *B06B 1/045* (2013.01); *H02K 33/12* (2013.01)

(58) Field of Classification Search
CPC ........ H02K 33/18; H02K 33/12; H02K 33/16; H02K 1/34; H02K 33/02; H02K 7/104; B06B 1/045
See application file for complete search history.

(56) References Cited

U.S. PATENT DOCUMENTS

2017/0310203 A1* 10/2017 Takeda ................... B06B 1/045

FOREIGN PATENT DOCUMENTS

| CN | 104335455 | 2/2015 |
|----|-----------|--------|
| CN | 106471719 | 3/2017 |

(Continued)

OTHER PUBLICATIONS

Akieda (JP 2011250637 A) English Translation (Year: 2011).*

(Continued)

*Primary Examiner* — Tulsidas C Patel
*Assistant Examiner* — Robert E Mates
(74) *Attorney, Agent, or Firm* — JCIPRNET (57) ABSTRACT

An actuator comprising: a support body; a movable body which is movable with respect to the support body; and a drive mechanism structured to drive the movable body; wherein the drive mechanism comprises: a first magnetic drive circuit which comprises a first coil and a first magnet facing each other in a first direction and is structured to drive the movable body in a second direction perpendicular to the first direction; and a second magnetic drive circuit which comprises a second coil and a second magnet facing each other in the first direction at a position overlapping with the first magnetic drive circuit in the first direction, the second magnetic drive circuit being structured to drive the movable body in a third direction perpendicular to the first direction and intersecting the second direction.

16 Claims, 8 Drawing Sheets

(56) References Cited

FOREIGN PATENT DOCUMENTS

| JP | H03296112 | | 12/1991 | |
|----|-----------|---|---------|---|
| JP | 2011250637 | | 12/2011 | |
| JP | 2011250637 A | * | 12/2011 | |
| JP | 2013243883 | | 12/2013 | |
| JP | 2016127789 | | 7/2016 | |
| WO | 2010103831 | | 9/2010 | |
| WO | WO-2016104349 A1 | * | 6/2016 | ............ H02K 33/16 |
| WO | 2016167297 | | 10/2016 | |

OTHER PUBLICATIONS

"Office Action of China Counterpart Application", dated Nov. 5, 2020, with English translation thereof, p. 1-p. 19.
"International Search Report (Form PCT/ISA/210) of PCT/JP2018/011586," dated May 22, 2018, with English translation thereof, pp. 1-4.

* cited by examiner

FIG. 8

ACTUATOR WITH TWO MAGNETIC DRIVE CIRCUITS TO VIBRATE A BODY IN TWO DIRECTIONS

CROSS-REFERENCE TO RELATED APPLICATION

This application is a 371 application of the international PCT application serial no. PCT/JP2018/011586, filed on Mar. 23, 2018, which claims the priority benefit of Japan application no. 2017-068657, filed on Mar. 30, 2017. The entirety of each of the above-mentioned patent applications is hereby incorporated by reference herein and made a part of this specification.

BACKGROUND

Technical Field

The present invention relates to an actuator which generates various vibrations.

Related Art

As an apparatus in which vibration is generated by a magnetic drive mechanism, an actuator has been proposed which includes a support body having a magnet and a movable body having a coil facing the magnet, and an elastic member is disposed between the movable body and the support body (see Patent Literature 1). Further, in the actuator described in Patent Literature 1, in a holder whose plate thickness direction is directed in a first direction, two first coils are provided at positions separated in a second direction perpendicular to the first direction, and two second coils are provided at positions separated in a third direction perpendicular to the first direction and the second direction. Further, in the support body, first magnets are disposed on both sides in the first direction with respect to the first coil and second magnets are disposed on both sides in the first direction with respect to the second coil. Therefore, the first coils and the first magnets structure a first magnetic drive mechanism which vibrates the movable body in the second direction, and the second coils and the second magnets structure a second magnetic drive mechanism which vibrates the movable body in the third direction. Therefore, vibration in the second direction and vibration in the third direction are generated by the actuator.

LITERATURE OF RELATED ART

Patent Literature

[PTL 1] Japanese Patent Laid-Open Publication No. 2016-127789

SUMMARY

Problems to be Solved by the Invention

In the actuator described in Patent Literature 1, in the movable body, the first coil and the second coil are planarly provided with respect to the holder whose plate thickness direction is directed in the first direction and thus, a plane area of the movable body is large. Therefore, the plane area of the actuator becomes large.

In view of the problem described above, an objective of the present invention is to provide an actuator whose plane area can be reduced.

Means to Solve the Problem

To solve the above-mentioned problem, an actuator in accordance with the present invention includes a support body, a movable body which is movable with respect to the support body, and a drive mechanism structured to drive the movable body. The drive mechanism includes a first magnetic drive circuit which has a first coil and a first magnet facing each other in a first direction and is structured to drive the movable body in a second direction perpendicular to the first direction, and a second magnetic drive circuit which has a second coil and a second magnet facing each other in the first direction at a position overlapping with the first magnetic drive circuit in the first direction, the second magnetic drive circuit being structured to drive the movable body in a third direction perpendicular to the first direction and intersecting the second direction.

In the present invention, the first magnetic drive circuit structured to vibrate the movable body in the second direction and the second magnetic drive circuit structured to vibrate the movable body in the third direction are provided and thus, the movable body can be vibrated in the second direction and the third direction. Therefore, a user is capable of feeling bodily sensation of vibration in the second direction, vibration in the third direction and vibration combined of the vibration in the second direction with the vibration in the third direction. Further, the first magnetic drive circuit and the second magnetic drive circuit are disposed so as to be overlapped with each other in the first direction and thus, a size (plane area) when the actuator is viewed in the first direction is small. Therefore, the actuator to which the present invention is applied is suitable to be mounted on an apparatus such as a controller which is held in a hand. Further, the drive mechanism is structured of the first magnetic drive circuit and the second magnetic drive circuit and thus, a size (thickness) in the first direction of the actuator can be reduced.

In the present invention, it may be structured that the actuator includes a first coil holder which holds the first coil, and a second coil holder which holds the second coil, and the first coil holder and the second coil holder are disposed so as to be overlapped with each other in the first direction and are connected with each other. According to this structure, the first coil holder and the second coil holder can be used as one coil holder in the support body or the movable body.

In the present invention, it may be structured that the first magnet faces in the first direction a first effective side portion of the first coil extended in the third direction, the second magnet faces in the first direction a second effective side portion of the second coil extended in the second direction, the first coil holder is provided with a first stopper part which faces the first magnet in the third direction to restrict a movable range in the third direction of the movable body, and the second coil holder is provided with a second stopper part which faces the second magnet in the second direction to restrict a movable range in the second direction of the movable body. According to this structure, the first magnet used in the first magnetic drive circuit for driving the movable body in the second direction is structured so that its dimension in the third direction is shorter than its dimension in the second direction and thus, the first stopper mechanism can be structured by utilizing spaces on both sides in the third direction with respect to the first magnet. Further, the second magnet used in the second magnetic drive circuit for driving the movable body in the third direction is structured so that its dimension in the second direction is shorter than its dimension in the third direction and thus, the second stopper mechanism for restricting a movable range in the second direction of the movable body can be structured by utilizing spaces on both sides in the second direction with respect to the second magnet. Therefore, the stopper mechanism is easily provided at a position overlapping in the first direction with the first magnetic drive circuit and the second magnetic drive circuit. Accordingly, a size (plane area) of the actuator viewed in the first direction can be further reduced.

In the present invention, it may be structured that the first coil holder includes a first frame part which holds the first coil on an inner side and a plurality of first pillar shaped parts which are protruded in the first direction from end parts of the first frame part, and the second coil holder includes a second frame part which holds the second coil on an inner side and a plurality of second pillar shaped parts which are protruded in the first direction from end parts of the second frame part, and the plurality of the first pillar shaped parts and the plurality of the second pillar shaped parts are connected with each other. According to this structure, a space for disposing a yoke and the like can be surely secured between the first coil and the second coil.

In the present invention, it may be structured that the actuator includes a plurality of yokes which are disposed on one side in the first direction with respect to the first coil, between the first coil and the second coil, and on the other side in the first direction with respect to the second coil, and the first magnet and the second magnet are held by either of the plurality of the yokes.

In the present invention, it may be structured that one of the yokes is disposed between the first coil and the second coil. According to this structure, the number of the yokes which are overlapped and disposed in the first direction can be reduced and thus, a size (thickness) in the first direction of the actuator can be reduced.

In the present invention, it may be structured that the first magnet is disposed on an opposite side to the second coil with respect to the first coil, and the second magnet is disposed on an opposite side to the first coil with respect to the second coil. According to this structure, the magnetic center position (drive center) of the first magnetic drive circuit and the magnetic center (drive center) of the second magnetic drive circuit are in close proximity to each other in the first direction. Therefore, when the movable body is driven in the second direction and the third direction, the movable body can be restrained from being inclined.

In the present invention, it may be structured that the first coil and the second coil are provided on a side of the support body, and the first magnet and the second magnet are provided on a side of the movable body.

In the present invention, it may be structured that an elastic member having elasticity or viscoelasticity is disposed in a portion where the movable body and the support body face each other in the first direction. According to this structure, when the movable body is vibrated in the second direction and the third direction with respect to the support body, the viscoelastic member is deformed in the shearing direction which is perpendicular to the expansion and contraction direction. Therefore, the viscoelastic member is deformed in a range having high linearity and thus, vibration characteristics having excellent linearity can be obtained.

In the present invention, it may be structured that the elastic member is disposed as a first elastic member which is contacted with both of the movable body and a portion of the support body facing the movable body on one side in the first direction, and a second elastic member which is contacted with both of the movable body and a portion of the support body facing the movable body on the other side in the first direction. In this case, it is preferable that the elastic member is adhesively bonded to the support body and the movable body on each of the one side in the first direction with respect to the movable body and the other side in the first direction with respect to the movable body. According to this structure, the viscoelastic member surely follows movement of the movable body and thus, resonance of the movable body can be prevented effectively.

In the present invention, it is preferable that the elastic member is provided in a compressed state in the first direction between the support body and the movable body on each of the one side in the first direction with respect to the movable body and the other side in the first direction with respect to the movable body. According to this structure, the viscoelastic member surely follows movement of the movable body and thus, resonance of the movable body can be prevented effectively.

In the present invention, it may be structured that the elastic member is a viscoelastic member. Viscoelasticity is a property provided with both of viscosity and elasticity and found remarkably in high molecular material such as gel member, plastic and rubber. Therefore, various gel members such as silicone-based gel may be used as the viscoelastic member.

BRIEF DESCRIPTION OF THE DRAWINGS

FIG. 8(a) through (e) of FIG. 8 are explanatory views schematically showing modified examples of a magnetic drive circuit which is used in an actuator to which the present invention is applied.

DESCRIPTION OF THE EMBODIMENTS

An embodiment of the present invention will be described below with reference to the accompanying drawings. In the following descriptions, three directions intersecting each other are defined as the "X" direction, the "Y" direction and the "Z" direction. The "Z" direction is a direction perpendicular to the "X" direction and the "Y" direction. Further, in the following descriptions, the "X1" is indicated on one side in the "X" direction, the "X2" is indicated on the other side in the "X" direction, the "Y1" is indicated on one side in the "Y" direction, the "Y2" is indicated on the other side in the "Y" direction, the "Z1" is indicated on one side in the "Z" direction, and the "Z2" is indicated on the other side in the "Z" direction. In this embodiment, the "X" direction, the "Y" direction and the "Z" direction respectively have the following relationships with respect to the directions in the present invention.

"X" direction="second direction" in the present invention
"Y" direction="third direction" in the present invention
"Z" direction="first direction" in the present invention (Entire Structure)

Figure 1:
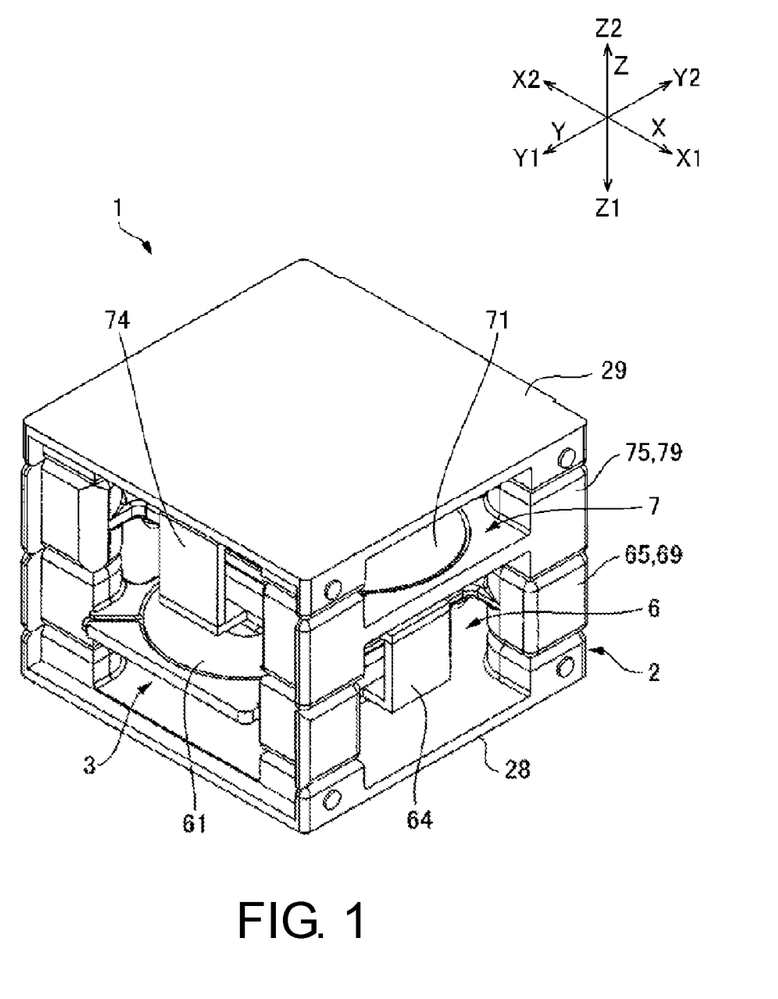
FIG. 1 is a perspective view showing an actuator to which the present invention is applied.
Figure 2:
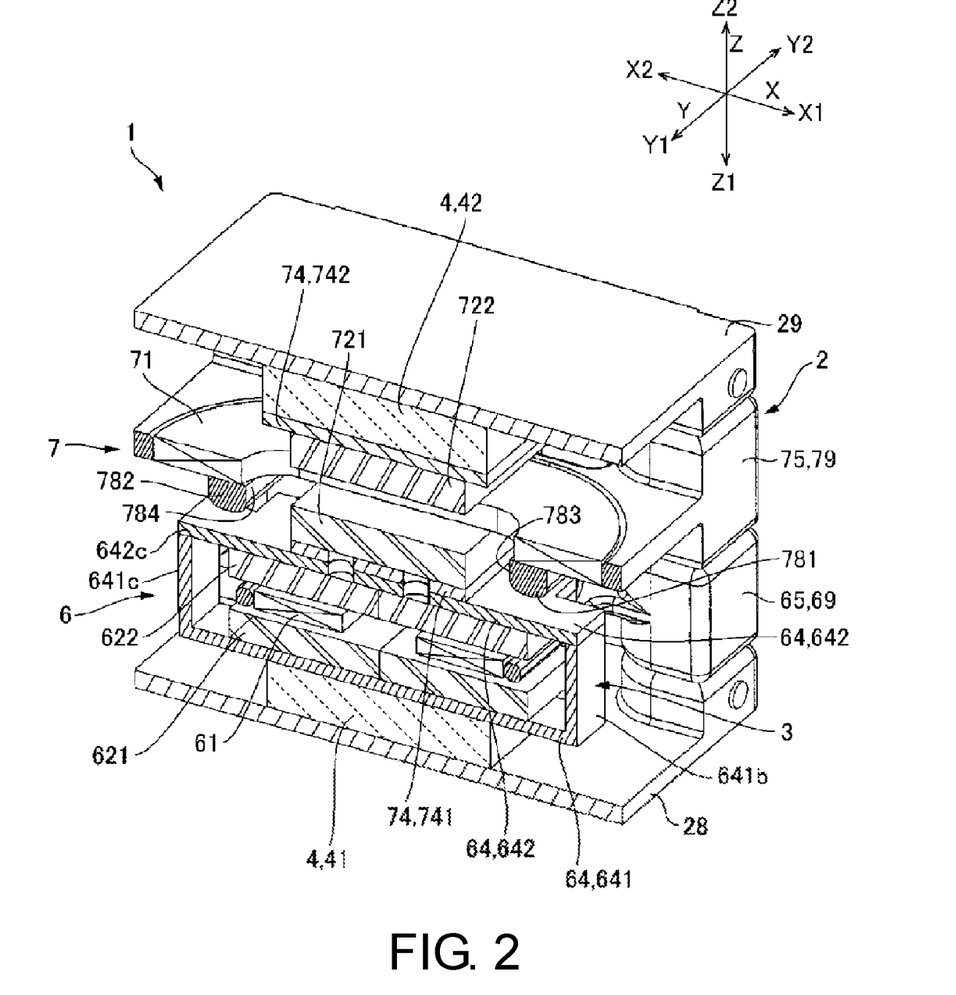
FIG. 2 is an explanatory view showing the actuator in FIG. 1 which is cut in a first direction and a second direction.
Figure 3:
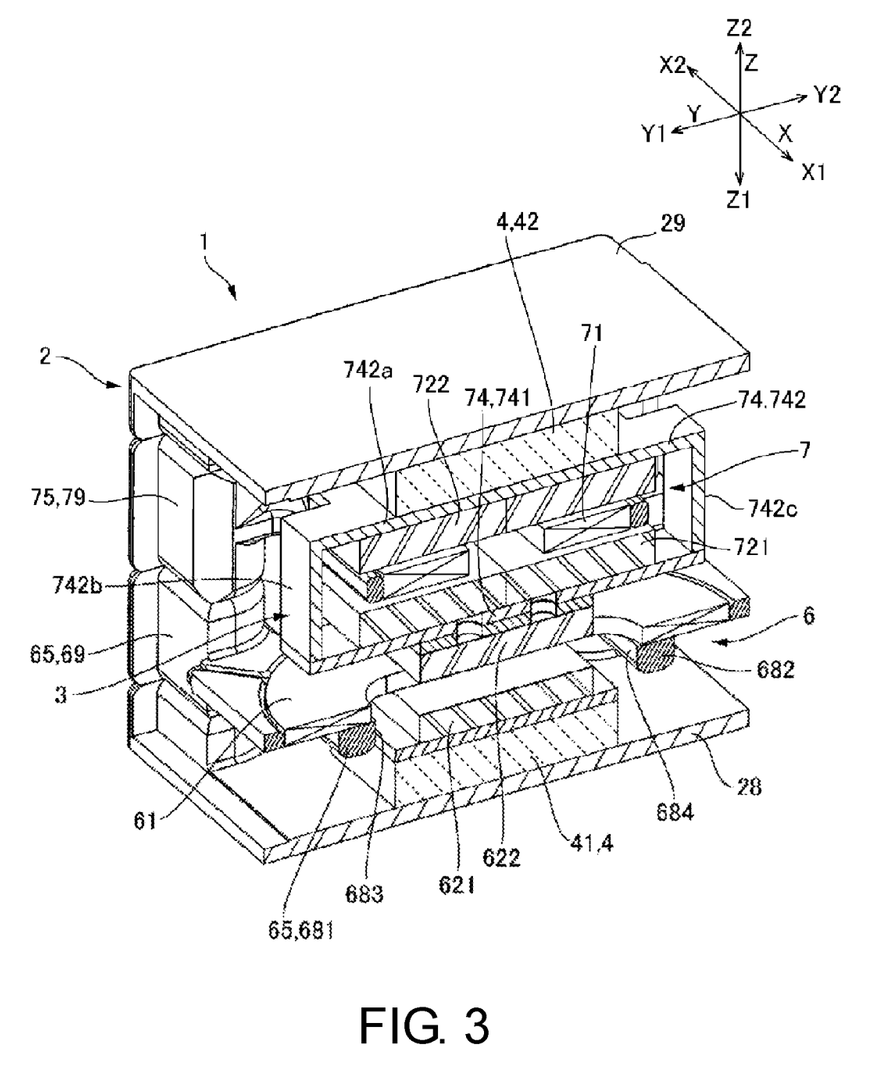
FIG. 3 is an explanatory view showing the actuator in FIG. 1 which is cut in the first direction and a third direction.
Figure 4:
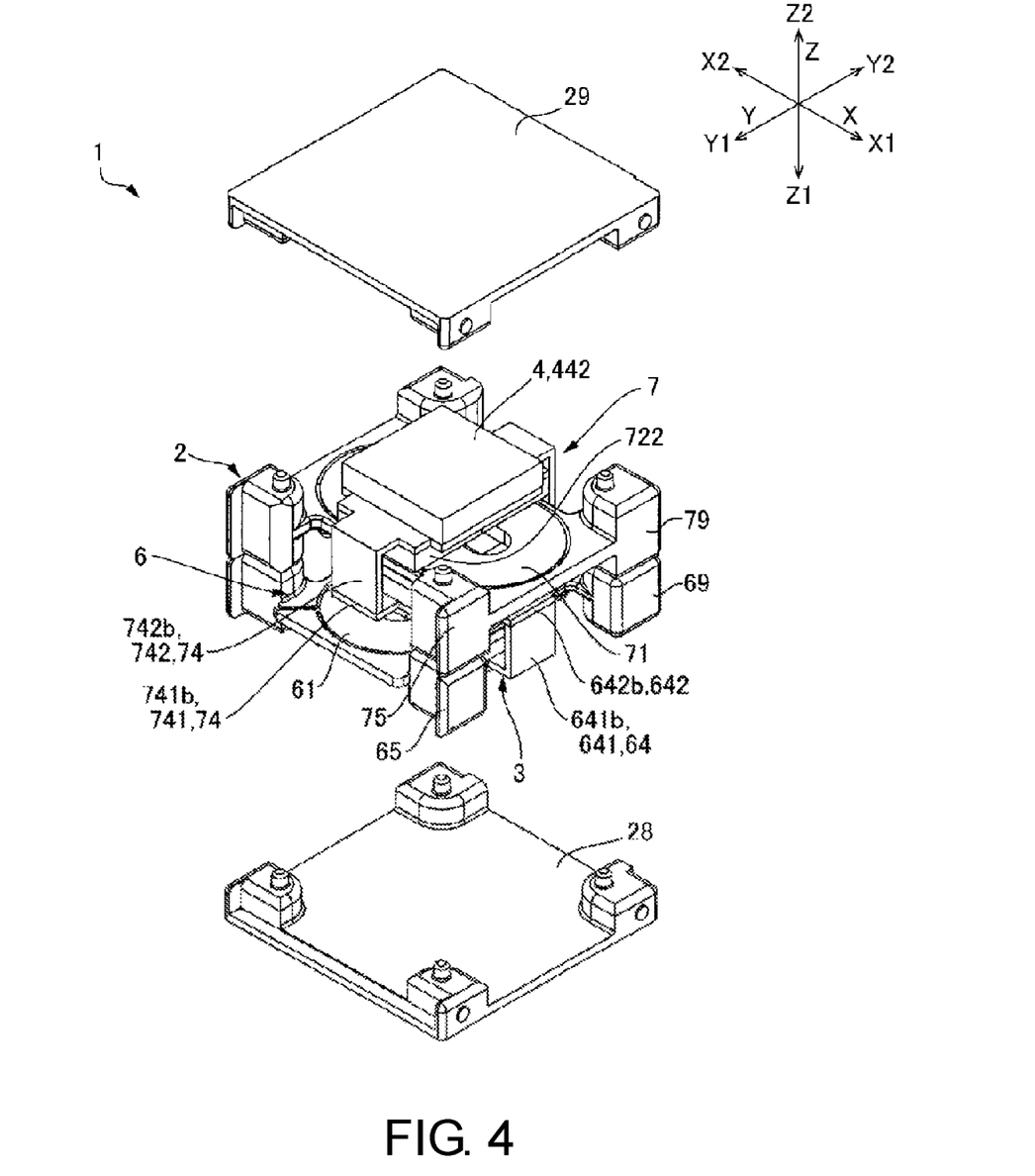
FIG. 4 is an exploded perspective view showing the actuator in FIG. 1 in a state that a first end plate and a second end plate shown are detached.

FIG. 1 is a perspective view showing an actuator 1 to which the present invention is applied. FIG. 2 is an explanatory view showing the actuator 1 in FIG. 1 which is cut in a first direction ("Z" direction) and a second direction ("X" direction). FIG. 3 is an explanatory view showing the actuator 1 in FIG. 1 which is cut in the first direction ("Z" direction) and the third direction ("Y" direction). FIG. 4 is an exploded perspective view showing the actuator 1 in a state that a first end plate 28 and a second end plate 29 shown in FIG. 1 are detached.

As shown in FIG. 1, an actuator 1 in this embodiment is formed in a substantially rectangular parallelepiped shape, and a wiring circuit board (not shown) is stuck to a face facing the "Y" direction or the "X" direction. End parts of coils described below are connected to the wiring circuit board. As shown in FIGS. 1, 2 and 3, the actuator 1 includes a support body 2, a movable body 3, an elastic member 4 disposed between the support body 2 and the movable body 3. The movable body 3 is supported by the support body 2 so as to be movable in the "Z" direction, the "X" direction and the "Y" direction through the elastic member 4. Further, the actuator 1 includes a drive mechanism structured to vibrate the movable body 3 with respect to the support body 2. In this embodiment, the drive mechanism is structured of a first magnetic drive circuit 6, which drives and vibrates the movable body 3 in the "X" direction with respect to the support body 2, and a second magnetic drive circuit 7 which drives and vibrates the movable body 3 in the "Y" direction with respect to the support body 2.

The support body 2 includes a first end plate 28 and a second end plate 29 at an end part on one side "Z1" and an end part on the other side "Z2" in the "Z" direction. The first end plate 28 faces the movable body 3 on one side "Z1" in the "Z" direction, and a first elastic member 41 (elastic member 4) is disposed between the movable body 3 and the first end plate 28. The second end plate 29 faces the movable body 3 on the other side "Z2" in the "Z" direction, and a second elastic member 42 (elastic member 4) is disposed between the movable body 3 and the second end plate 29.

In this embodiment, the elastic member 4 is a viscoelastic body having viscoelasticity and, in this embodiment, a plate-shaped gel damper member is used as the elastic member 4 (viscoelastic body). Both faces in the "Z" direction of the first elastic member 41 are respectively connected with the movable body 3 and the first end plate 28 by a method such as adhesion. Both faces in the "Z" direction of the second elastic member 42 are respectively connected with the movable body 3 and the second end plate 29 by a method such as adhesion. In other words, the elastic member 4 is a plate-shaped gel member which is provided on both of one side "Z1" in the first direction "Z" with respect to the movable body 3 and the other side "Z2" in the first direction "Z" with respect to the movable body 3. Further, the elastic member 4 is disposed as the first elastic member 41, which is contacted with both of the movable body 3 and a portion (first end plate 28) of the support body 2 which faces the movable body 3 on one side "Z1" in the first direction "Z", and the second elastic member 42 which is contacted with both of the movable body 3 and a portion (second end plate 29) of the support body 2 which faces the movable body 3 on the other side "Z2" in the first direction "Z".

A gel damper member is provided with linearly or non-linearly expansion and contraction characteristics according to its expansion and contraction direction. For example, a plate-shaped gel damper member is provided with an expansion and contraction characteristic in which, when pressed in its thickness direction (axial direction) and compressively deformed, a non-linear component is larger than a linear component. On the other hand, when pulled and extended in the thickness direction (axial direction), the plate-shaped gel damper member is provided with an expansion and contraction characteristic in which a linear component is larger than a non-linear component. Further, also in a case that the plate-shaped gel damper member is deformed in a direction (shearing direction) intersecting the thickness direction (axial direction), the plate-shaped gel damper member is provided with a deformation characteristic in which a linear component is larger than a non-linear component. In this embodiment, when the movable body 3 is vibrated in the "X" direction and the "Y" direction, the elastic member 4 (viscoelastic body) is structured so as to be deformed in the shearing direction.

Each of a plurality of the magnetic drive circuits (first magnetic drive circuit 6 and second magnetic drive circuit 7) includes a coil and a magnet facing the coil. The coil is provided in one side member of the support body 2 and the movable body 3, and the magnet is provided in the other side member. In this embodiment, as described below, the coil (first coil 61 and second coil 71) and a coil holder (first coil holder 65 and second coil holder 75) are provided in the support body 2. Further, the magnet (first magnets 621 and 622 and second magnets 721 and 722) and a yoke (first yoke 64 and second yoke 74) are provided in the movable body 3. Further, the first magnetic drive circuit 6 is disposed so as to be overlapped with the second magnetic drive circuit 7 on one side "Z1" in the "Z" direction. Therefore, the first magnetic drive circuit 6 and the second magnetic drive circuit 7 are disposed so as to be overlapped from one side "Z1" to the other side "Z2" in this order in the "Z" direction.

(Structure of Drive Mechanism)

Figure 5:
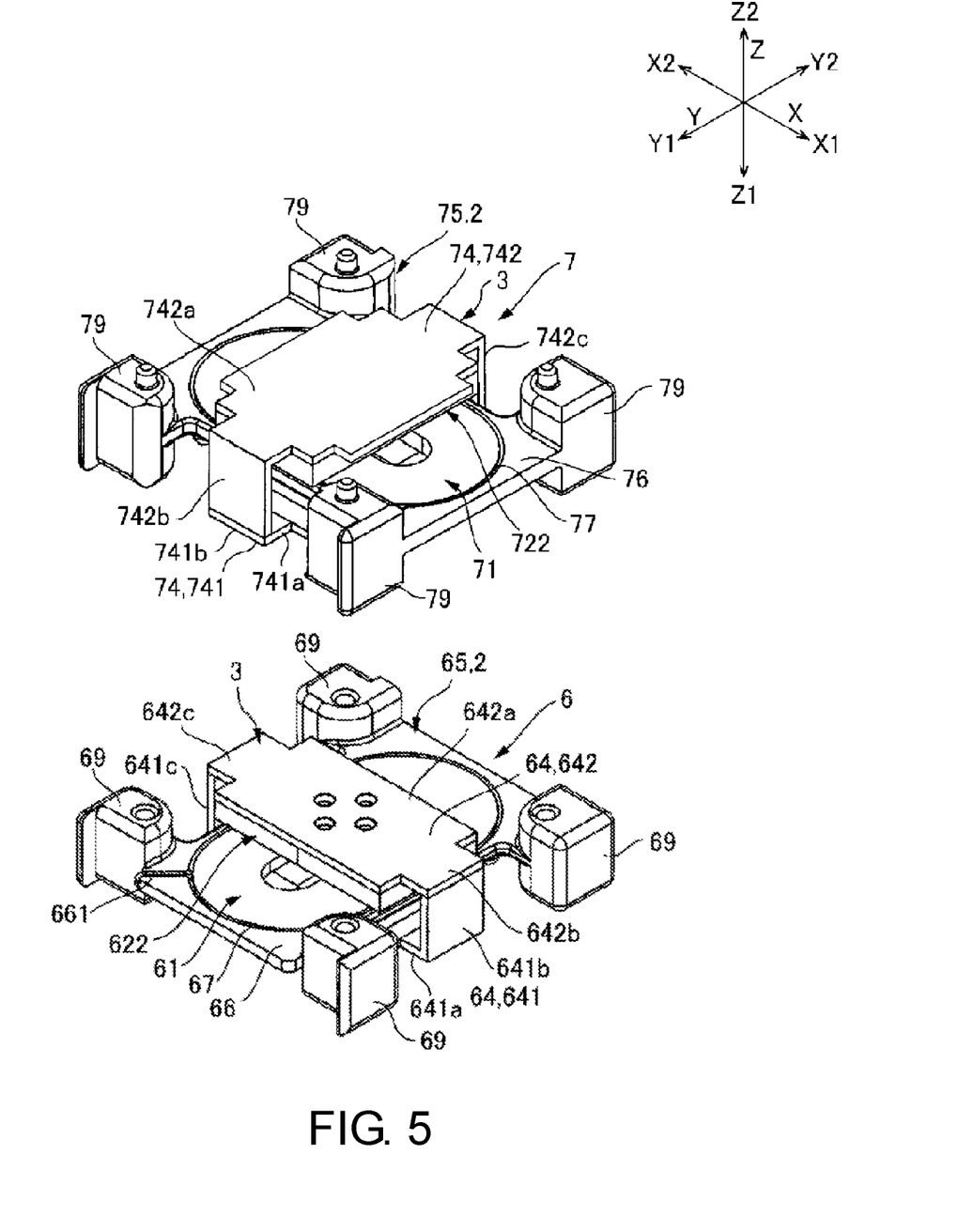
FIG. 5 is an exploded perspective view showing a state that a drive mechanism used in the actuator shown in FIG. 1 is disassembled.

FIG. 5 is an exploded perspective view showing a state that the drive mechanism used in the actuator 1 shown in FIG. 1 is disassembled. As shown in FIGS. 2, 3, 4 and 5, the first magnetic drive circuit 6 includes the first coil 61, a first magnet 621 facing the first coil 61 on one side "Z1" in the "Z" direction and a first magnet 622 facing the first coil 61 on the other side "Z2" in the "Z" direction. The second magnetic drive circuit 7 includes the second coil 71, a second magnet 721 facing the second coil 71 on one side "Z1" in the "Z" direction and a second magnet 722 facing the second coil 71 on the other side "Z2" in the "Z" direction. The second magnetic drive circuit 7 (second coil 71 and second magnets 721 and 722) is provided at a position overlapping with the first magnetic drive circuit 6 on the other side "Z2" in the "Z" direction.

In order that the first magnetic drive circuit 6 and the second magnetic drive circuit 7 structured as described above are disposed in an overlapped state in the "Z" direction, the support body 2 includes a first coil holder 65 holding the first coil 61 and a second coil holder 75 holding the second coil 71. The first coil holder 65 and the second coil holder 75 are disposed in an overlapped state from one side "Z1" to the other side "Z2" in the "Z" direction in this order. Further, the first coil holder 65 and the second coil holder 75 are connected with each other.

Further, the movable body 3 includes a plurality of yokes (first yoke 64 and second yoke 74) which are disposed on one side "Z1" in the "Z" direction with respect to the first coil 61, between the first coil 61 and the second coil 71, and on the other side "Z2" in the "Z" direction with respect to the second coil 71. The first magnets 621 and 622 and the second magnets 721 and 722 are held by either of the plurality of the yokes. Further, yokes of the plurality of the yokes adjacent to each other are connected with each other in the "Z" direction. In this embodiment, the plurality of the yokes includes the first yoke 64 disposed on both sides in the "Z" direction with respect to the first coil 61 and the second yoke 74 disposed on both sides in the "Z" direction with respect to the second coil 71. The first yoke 64 holds the first magnets 621 and 622 which are disposed on both sides in the "Z" direction with respect to the first coil 61. The second yoke 74 holds the second magnets 721 and 722 which are disposed on both sides in the "Z" direction with respect to the second coil 71.

(Detailed Structure of First Magnetic Drive Circuit 6)

Figure 6:
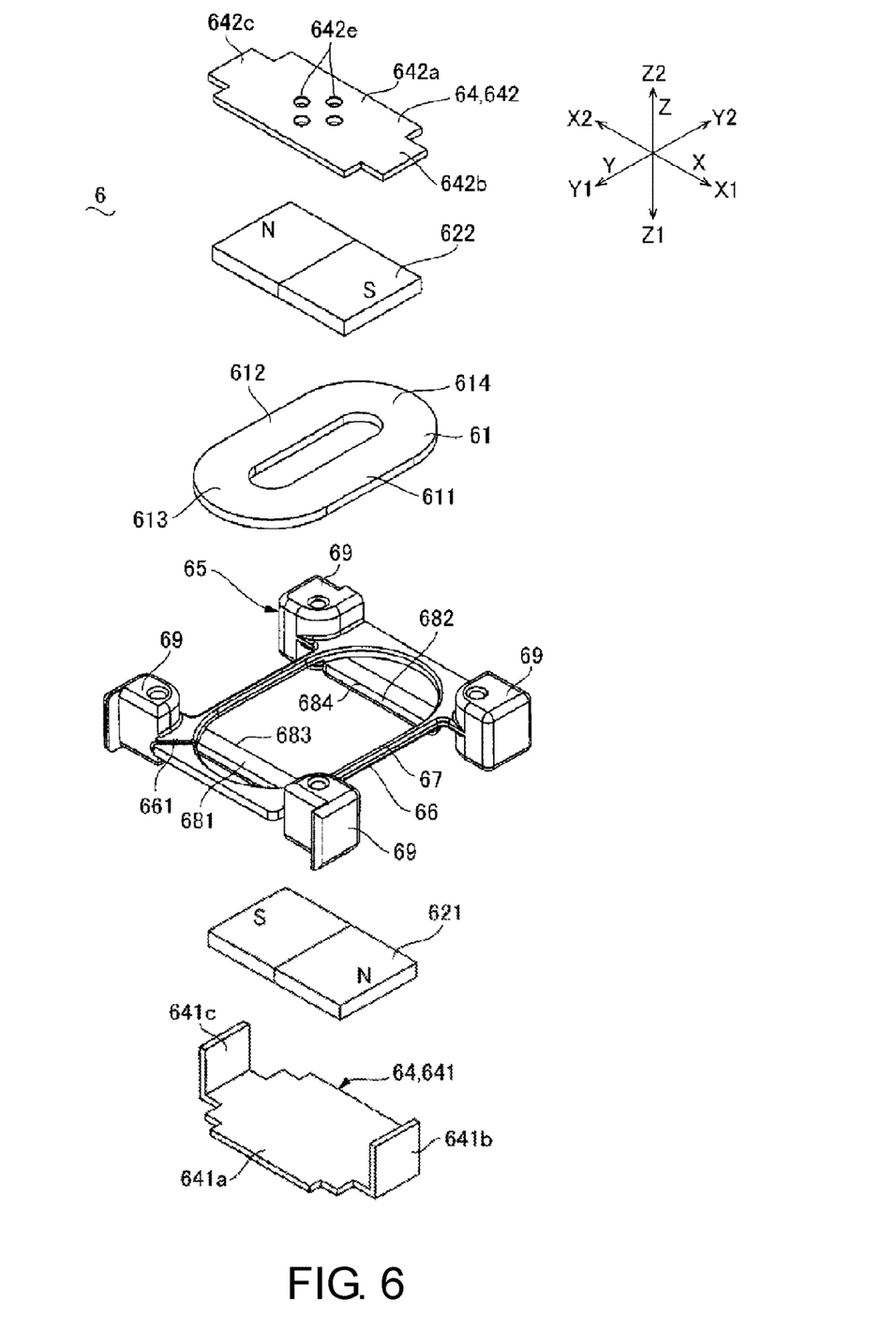
FIG. 6 is an exploded perspective view showing a first magnetic drive circuit in FIG. 5.

FIG. 6 is an exploded perspective view showing the first magnetic drive circuit 6 in FIG. 5. As shown in FIGS. 4, 5 and 6, the first coil holder 65 is provided with a first frame part 66 which holds the first coil 61 on its inner side, and a plurality of first pillar shaped parts 69 which are protruded from end parts (four corners) of the first frame part 66 to both sides in the "Z" direction. The first pillar shaped parts 69 are connected with the first end plate 28. The first coil holder 65 is made of resin or made of metal. In this embodiment, the first coil holder 65 is made of resin.

The first coil 61 used in the first magnetic drive circuit 6 is an air core coil in an elliptical shape which is provided with first effective side portions 611 and 612 (long side portion) extended in the "Y" direction. In response to the shape, the first frame part 66 of the first coil holder 65 is formed with a first opening part 67 in an elliptical shape whose long-diameter direction is directed in the "Y" direction, and the first coil 61 is fixed to an inner side of the first opening part 67 by adhesion or the like.

In the first coil holder 65, on one side "Z1" in the "Z" direction with respect to the first frame part 66, first seat parts 681 and 682 which support first ineffective side portions 613 and 614 (short side portion) extended in the "X" direction at both end parts of the first coil 61 on one side "Z1" in the "Z" direction are formed at positions overlapping with both end parts in the "Y" direction of the first opening part 67. The first seat parts 681 and 682 are protruded to one side "Z1" in the "Z" direction from the first frame part 66 to structure a bottom part on one side "Z1" in the "Z" direction at both end parts in the "Y" direction of the first opening part 67. On a face on the other side "Z2" in the "Z" direction of the first frame part 66, a groove 661 is extended from the first opening part 67 toward the other side "X2" in the "X" direction and toward one side "Y1" in the "Y" direction. The groove 661 is a guide groove for passing a lead-out portion of a winding start of the first coil 61. A thickness (dimension in the "Z" direction) of the first frame part 66 is larger than a thickness (dimension in the "Z" direction) of the first coil 61. Therefore, in a state that the first coil 61 is accommodated on an inner side of the first opening part 67, the first coil 61 does not protrude to the other side "Z2" in the "Z" direction from the first frame part 66.

Each of the first magnets 621 and 622 is formed in a rectangular planar shape, and its long side is extended in the "X" direction and its short side is extended in the "Y" direction. Each of the first magnets 621 and 622 is polarized and magnetized in the "X" direction, and an "N"-pole and an "S"-pole respectively face the first effective side portions 611 and 612 of the first coil 61. Therefore, when an electric current is supplied to the first coil 61, the first magnetic drive circuit 6 generates a drive force for driving the movable body 3 in the "X" direction. In the first magnetic drive circuit 6, the first yoke 64 is structured of a yoke plate 641 disposed on one side "Z1" in the "Z" direction with respect to the first coil 61 and a yoke plate 642 disposed on the other side "Z2" in the "Z" direction with respect to the first coil 61. The yoke plate 641 is provided with a flat plate-shaped magnet holding part 641a holding the first magnet 621 on a face on the other side "Z2" in the "Z" direction and side plate parts 641b and 641c which are bent from both end parts in the "X" direction of the magnet holding part 641a toward the other side "Z2" in the "Z" direction. The yoke plate 642 is provided with a flat plate-shaped magnet holding part 642a holding the first magnet 622 on a face on one side "Z1" in the "Z" direction and connecting plate parts 642b and 642c which are protruded from both end parts in the "X" direction of the magnet holding part 642a to one side "X1" and the other side "X2" in the "X" direction. In this embodiment, a tip end part of the side plate part 641b of the yoke plate 641 and a tip end part of the connecting plate part 642b of the yoke plate 642 are connected with each other by welding, caulking or the like, and a tip end part of the side plate part 641c of the yoke plate 641 and a tip end part of the connecting plate part 642c of the yoke plate 642 are connected with each other by welding, caulking or the like.

(Detailed Structure of Second Magnetic Drive Circuit 7)

Figure 7:
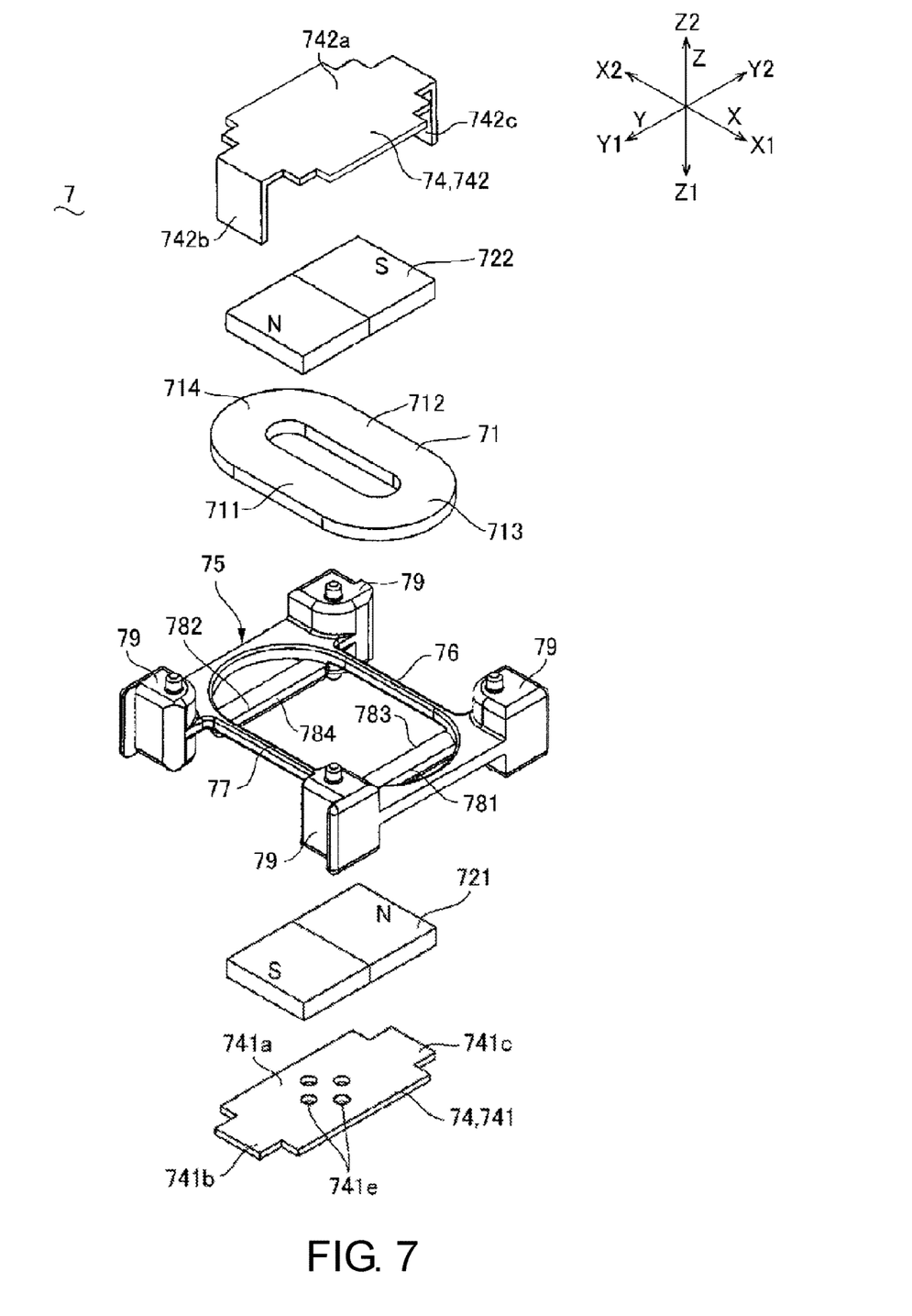
FIG. 7 is an exploded perspective view showing a second magnetic drive circuit in FIG. 5.

FIG. 7 is an exploded perspective view showing the second magnetic drive circuit 7 shown in FIG. 5. As shown in FIGS. 4, 5 and 7, the second coil holder 75 is provided with a second frame part 76 holding the second coil 71 on an inner side and a plurality of second pillar shaped parts 79 which are protruded to both sides in the "Z" direction from end parts (four corners) of the second frame part 76. The second pillar shaped part 79 is connected with the first pillar shaped part 69 of the first coil holder 65 which is adjacent on one side "Z1" in the "Z" direction. Further, the second pillar shaped parts 79 are connected with the second end plate 29. The second coil holder 75 is made of resin or made of metal. In this embodiment, the second coil holder 75 is made of resin.

The second coil 71 used in the second magnetic drive circuit 7 is an air core coil in an elliptical shape which is provided with second effective side portions 711 and 712 (long side portion) extended in the "X" direction. In response to the shape, the second frame part 76 of the second coil holder 75 is formed with a second opening part 77 in an elliptical shape whose long-diameter direction is directed in the "X" direction, and the second coil 71 is fixed to an inner side of the second opening part 77 by adhesion or the like.

In the second coil holder 75, on one side "Z1" in the "Z" direction with respect to the second frame part 76, second seat parts 781 and 782 which support second ineffective side portions 713 and 714 (short side portion) extended in the "Y" direction at both end parts of the second coil 71 on one side "Z1" in the "Z" direction are formed at positions overlapping with both end parts in the "X" direction of the second opening part 77. The second seat parts 781 and 782 are protruded to one side "Z1" in the "Z" direction from the second frame part 76 to structure a bottom part on one side "Z1" in the "Z" direction at both end parts in the "X" direction of the second opening part 77. On a face on the other side "Z2" in the "Z" direction of the second frame part 76, a groove (not shown) is extended from the second opening part 77 toward one side "X1" in the "X" direction and toward one side "Y1" in the "Y" direction. The groove is a guide groove for passing a lead-out portion of a winding start of the second coil 71. A thickness (dimension in the "Z" direction) of the second frame part 76 is larger than a thickness (dimension in the "Z" direction) of the second coil 71. Therefore, in a state that the second coil 71 is accommodated on an inner side of the second opening part 77, the second coil 71 does not protrude to the other side "Z2" in the "Z" direction from the second frame part 76.

Each of the second magnets 721 and 722 is formed in a rectangular planar shape, and its long side is extended in the "Y" direction and its short side is extended in the "X" direction. Each of the second magnets 721 and 722 is polarized and magnetized in the "Y" direction, and an "N"-pole and an "S"-pole respectively face the second effective side portions 711 and 712 of the second coil 71. Therefore, when an electric current is supplied to the second coil 71, the second magnetic drive circuit 7 generates a drive force for driving the movable body 3 in the "Y" direction. In the second magnetic drive circuit 7, the second yoke 74 is structured of a yoke plate 741 disposed on one side "Z1" in the "Z" direction with respect to the second coil 71 and a yoke plate 742 disposed on the other side "Z2" in the "Z" direction with respect to the second coil 71. The yoke plate 742 is provided with a flat plate-shaped magnet holding part 742a holding the second magnet 722 on a face on one side "Z1" in the "Z" direction and side plate parts 742b and 742c which are bent from both end parts in the "Y" direction of the magnet holding part 742a toward one side "Z1" in the "Z" direction. The yoke plate 741 is provided with a flat plate-shaped magnet holding part 741a holding the second magnet 721 on a face on the other side "Z2" in the "Z" direction and connecting plate parts 741b and 741c which are protruded from both end parts in the "Y" direction of the magnet holding part 741a to one side "Y1" and the other side "Y2" in the "Y" direction. In this embodiment, a tip end part of the side plate part 742b of the yoke plate 742 and a tip end part of the connecting plate part 741b of the yoke plate 741 are connected with each other by welding, caulking or the like, and a tip end part of the side plate part 742c of the yoke plate 742 and a tip end part of the connecting plate part 741c of the yoke plate 741 are connected with each other by welding, caulking or the like. The yoke plate 741 and the yoke plate 642 are formed with holes 741e and 642e and, after the yoke plate 741 and the yoke plate 642 have been positioned with the holes 741e and 642e as a reference, the yoke plate 741 and the yoke plate 642 are connected in the insides of the holes 741e and 642e by welding, caulking or the like.

(Positional Relationship between Magnetic Center of Magnetic Drive Circuit and Center of Gravity of Movable Body 3)

In the actuator 1 structured as described above, the first coil 61, the second coil 71, the first coil holder 65 and the second coil holder 75 are structured in line symmetry with an imaginary line passing at a center in the "X" direction of the movable body 3 and extending in the "Y" direction as a center, and are structured in line symmetry with an imaginary line passing at a center in the "Y" direction and extending in the "X" direction as a center. Further, the first magnets 621 and 622, the second magnets 721 and 722, the first yoke 64 and the second yoke 74 are structured in line symmetry with the imaginary line passing at the center in the "X" direction of the movable body 3 and extending in the "Y" direction as a center, and are structured in line symmetry with the imaginary line passing at the center in the "Y" direction and extending in the "X" direction as a center.

Therefore, a magnetic center position (drive center) of the first magnetic drive circuit 6 is located at a position coincided with a center of gravity of the movable body 3 in the "X" direction and the "Y" direction or located at a substantially coincided position. Further, a magnetic center position (drive center) of the second magnetic drive circuit 7 is located at a position coincided with the center of gravity of the movable body 3 in the "X" direction and the "Y" direction or located at a substantially coincided position.

(Basic Operation)

In the actuator 1 in this embodiment, while an alternating current is supplied to the first coil 61 and, when energization to the second coil 71 is stopped, the movable body 3 is vibrated in the "X" direction and thus, the center of gravity in the actuator 1 is varied in the "X" direction. Therefore, a user is capable of bodily sensing vibration in the "X" direction. In this case, when an alternating current waveform supplied to the first coil 61 is controlled so that acceleration of the movable body 3 moved to one side "X1" in the "X" direction and acceleration of the movable body 3 moved to the other side "X2" in the "X" direction are set to be different from each other, a user is capable of bodily sensing vibration having directivity in the "X" direction. Further, while an alternating current is supplied to the second coil 71, energization to the first coil 61 is stopped. As a result, the movable body 3 is vibrated in the "Y" direction and thus, the center of gravity in the actuator 1 is varied in the "Y" direction. Therefore, a user is capable of bodily sensing vibration in the "Y" direction. In this case, when an alternating current waveform supplied to the second coil 71 is controlled so that acceleration of the movable body 3 moved to one side "Y1" in the "Y" direction and acceleration of the movable body 3 moved to the other side "Y2" in the "Y" direction are set to be different from each other, a user is capable of bodily sensing vibration having directivity in the "Y" direction.

Further, energizations to the first coil 61 and the second coil 71 are combined with each other, a user is capable of obtaining a bodily feeling combined of vibration in the "X" direction with vibration in the "Y" direction.

(Stopper Mechanism)

In the actuator 1 in this embodiment, a stopper mechanism shown in FIGS. 2 and 3 is provided so that a portion having low strength is not abutted when the movable body 3 is excessively moved with respect to the support body 2. More specifically, as shown in FIG. 3, the first seat part 681 of the first coil holder 65 is located at a position so as to face the first magnet 621 on one side "Y1" in the "Y" direction through a predetermined space, and the first seat part 682 of the first coil holder 65 is located at a position so as to face the first magnet 621 on the other side "Y2" in the "Y" direction through a predetermined space. In this embodiment, side end parts of the first seat parts 681 and 682 facing the first magnet 621 in the "Y" direction function as first stopper parts 683 and 684. Therefore, a movable range in the "Y" direction of the movable body 3 when the movable body 3 is driven in the "Y" direction by the second magnetic drive circuit 7 is restricted by a first stopper mechanism which is structured of the first magnet 621 of the first magnetic drive circuit 6 and the first seat parts 681 and 682 (first stopper parts 683 and 684) of the first coil holder 65.

In this embodiment, the first stopper parts 683 and 684 are located on sides of the first magnet 621 with respect to inner edges of the first ineffective side portions 613 and 614 of the first coil 61. Therefore, even in a case that a lead-out portion on a winding start side of the first coil 61 is, for example, passed from the inner edge of the first ineffective side portion 613 between the first coil 61 and the first seat part 681, a situation is hard to be occurred that the first magnet 621 is contacted with the lead-out portion on the winding start side of the first coil 61. Therefore, a situation is hard to be occurred that the lead-out portion on the winding start side of the first coil 61 is disconnected.

Further, as shown in FIG. 2, the second seat part 781 of the second coil holder 75 is located at a position so as to face the second magnet 721 on one side "X1" in the "X" direction through a predetermined space, and the second seat part 782 of the second coil holder 75 is located at a position so as to face the second magnet 721 on the other side "X2" in the "X" direction through a predetermined space. In this embodiment, side end parts of the second seat part 781 and the second seat part 782 facing the second magnet 721 in the "X" direction function as second stopper parts 783 and 784. Therefore, a movable range when the movable body 3 is driven in the "X" direction by the first magnetic drive circuit 6 is restricted by a second stopper mechanism which is structured of the second magnet 721 of the second magnetic drive circuit 7 and the second seat parts 781 and 782 (second stopper parts 783 and 784) of the second coil holder 75.

In this embodiment, the second stopper parts 783 and 784 are located on sides of the second magnet 721 with respect to inner edges of the second ineffective side portions 713 and 714 of the second coil 71. Therefore, even in a case that a lead-out portion on a winding start side of the second coil 71 is, for example, passed from the inner edge of the second ineffective side portion 713 between the second coil 71 and the second seat part 781, a situation is hard to be occurred that the second magnet 721 is contacted with the lead-out portion on the winding start side of the second coil 71. Therefore, a situation is hard to be occurred that the lead-out portion on the winding start side of the second coil 71 is disconnected.

(Principal Effects in this Embodiment)

As described above, in the actuator 1 in this embodiment, the first magnetic drive circuit 6 (drive mechanism) structured to vibrate the movable body 3 in the "X" direction and the second magnetic drive circuit 7 (drive mechanism) structured to vibrate the movable body 3 in the "Y" direction are provided and thus, the movable body 3 can be vibrated in the "X" direction and the "Y" direction. Therefore, a user is capable of feeling bodily sensation of vibration in the "X" direction, vibration in the "Y" direction and vibration combined of the vibration in the "X" direction with the vibration in the "Y" direction. Further, the first magnetic drive circuit 6 and the second magnetic drive circuit 7 are disposed so as to be overlapped with each other in the "Z" direction and thus a size (plane area) when the actuator 1 is viewed in the "Z" direction is small. Therefore, the actuator 1 in this embodiment is suitable to be mounted on an apparatus such as a controller held in a hand. Further, the actuator 1 is structured of the first magnetic drive circuit 6 and the second magnetic drive circuit 7 disposed in an overlapped state in the "Z" direction and thus, a size (thickness) in the first direction of the actuator can be reduced.

Further, a movable range in the "Y" direction of the movable body 3 when the movable body 3 is driven in the "Y" direction by the second magnetic drive circuit 7 is restricted by the first stopper mechanism which is structured of the first magnet 621 of the first magnetic drive circuit 6 and the first seat parts 681 and 682 of the first coil holder 65. Further, a movable range when the movable body 3 is driven in the "X" direction by the first magnetic drive circuit 6 is restricted by the second stopper mechanism which is structured of the second magnet 721 of the second magnetic drive circuit 7 and the second seat parts 781 and 782 of the second coil holder 75. Therefore, even when the movable body 3 is moved excessively, portions having low strength are hard to be abutted with each other and thus reliability of the actuator 1 is high. In addition, the stopper mechanism is structured by utilizing the first magnet 621, the first seat parts 681 and 682 of the first coil holder 65 and the second magnet 721 and thus, the stopper mechanism can be provided at a position overlapping with the first magnetic drive circuit 6 and the second magnetic drive circuit 7 in the "Z" direction. Therefore, a plane area of the actuator 1 when viewed in the "Z" direction can be reduced.

Further, the first magnet 621 used in the first magnetic drive circuit 6 for driving the movable body 3 in the "X" direction is structured so that its dimension in the "Y" direction is shorter than its dimension in the "X" direction and thus, the first stopper mechanism for restricting a movable range in the "Y" direction of the movable body 3 can be structured by utilizing spaces on both sides in the "Y" direction with respect to the first magnet 621. Further, the second magnet 721 used in the second magnetic drive circuit 7 for driving the movable body 3 in the "Y" direction is structured so that its dimension in the "X" direction is shorter than its dimension in the "Y" direction and thus, the second stopper mechanism for restricting a movable range in the "X" direction of the movable body 3 can be structured by utilizing spaces on both sides in the "X" direction with respect to the second magnet 721. Therefore, the stopper mechanism is easily provided at a position overlapping with the first magnetic drive circuit 6 and the second magnetic drive circuit 7 in the "Z" direction.

Further, the first stopper parts 683 and 684 are structured by utilizing the first seat parts 681 and 682 of the first coil holder 65 which supports the first coil 61, and the second stopper parts 783 and 784 are structured by utilizing the second seat parts 781 and 782 of the second coil holder 75 which supports the second coil 71. Therefore, the first coil holder 65 and the second coil holder 75 are not required to provide another protruded part (stopper part) which is different from the first seat parts 681 and 682 and the second seat parts 781 and 782. Therefore, structures of the first coil holder 65 and the second coil holder 75 can be simplified.

Further, magnetic center positions (drive point) of the first magnetic drive circuit 6 and the second magnetic drive circuit 7 are located at a position coincided with the center of gravity of the movable body 3 in the "X" direction and the "Y" direction, or located at a substantially coincided position and thus, when the movable body 3 is vibrated in the "X" direction and the "Y" direction, a situation that the movable body 3 is inclined or the like is hard to be occurred.

Further, in the support body 2, the first coil holder 65 and the second coil holder 75 are disposed in an overlapped state in order in the "Z" direction and are connected with each other. Therefore, the first coil holder 65 and the second coil holder 75 can be used in the support body 2 as an integrated coil holder. In this case, the first coil holder 65 and the second coil holder 75 are connected with each other by the first pillar shaped parts 69 of the first coil holder 65 and the second pillar shaped parts 79 of the second coil holder 75 and thus, the first coil holder 65 and the second coil holder 75 can be integrated with each other in a state that spaces are secured for disposing a magnet and a yoke between the first coil 61 and the second coil 71.

Further, in the movable body 3, yokes adjacent to each other in the "Z" direction of a plurality of the yokes (first yoke 64 and second yoke 74) are connected with each other and thus, the plurality of the yokes (first yoke 64 and second yoke 74) can be used as an integrated yoke in the movable body 3.

Further, the elastic member 4 is a viscoelastic member having viscoelasticity and is provided on each of one side "Z1" in the "Z" direction with respect to the movable body 3 and the other side "Z2" in the "Z" direction with respect to the movable body 3. Therefore, when the movable body 3 is vibrated in the "X" direction and the "Y" direction with respect to the support body 2, the elastic member 4 is deformed in the shearing direction which is perpendicular to the expansion and contraction direction. Accordingly, the elastic member 4 is deformed in a range where linearity is high and thus, vibration characteristics having excellent linearity can be obtained.

In other words, the elastic member 4 (first elastic member 41 and second elastic member 42) is a plate-shaped viscoelastic member and is provided with linear or nonlinear expansion and contraction characteristics according to the expansion and contraction direction. For example, the elastic member 4 is provided with an expansion and contraction characteristic in which, when pressed in its thickness direction (axial direction) and compressively deformed, a non-linear component is larger than a linear component (spring coefficient). On the other hand, when pulled and extended in the thickness direction (axial direction), the elastic member 4 is provided with an expansion and contraction characteristic in which a linear component (spring coefficient) is larger than a non-linear component (spring coefficient). Further, in a case that the elastic member 4 is deformed in a direction (shearing direction) intersecting the thickness direction (axial direction), even when moved in either direction, the elastic member 4 is deformed in a pulled and extended direction and thus, the elastic member 4 is provided with a deformation characteristic in which a linear component (spring coefficient) is larger than a non-linear component (spring coefficient). In this embodiment, when the movable body 3 is vibrated in the "X" direction and the "Y" direction, the elastic member 4 (viscoelastic member) is structured so as to deform in a shearing direction. Therefore, when the movable body 3 is vibrated in the "X" direction and the "Y" direction, a spring force in a direction of motion in the elastic member 4 becomes constant. Accordingly, reproducibility of vibrational acceleration with respect to an input signal can be improved by using a spring element in the shearing direction of the elastic member 4 and thus, vibration can be realized with a delicate nuance.

Further, the elastic member 4 is attached so as to expand and contract in the first direction "Z" between the movable body 3 and the support body 2 and, when the elastic member 4 is pushed in a thickness direction (axial direction) and compressively deformed between the movable body 3 and the support body 2, the elastic member 4 is provided with an expansion and contraction characteristic in which a non-linear component (spring coefficient) is larger than a linear component (spring coefficient). Therefore, the elastic member 4 can be restrained from being largely deformed in the "Z" direction perpendicular to a driving direction of the movable body 3 and thus, a gap between the movable body 3 and the support body 2 can be restrained from being largely varied.

Further, both sides in the "Z" direction of the first elastic member 41 are respectively connected with the movable body 3 and the first end plate 28 by a method such as adhesion, and both sides in the "Z" direction of the second elastic member 42 are respectively connected with the movable body 3 and the second end plate 29 by a method such as adhesion. Therefore, the elastic member 4 surely follows movement of the movable body 3 and thus, resonance of the movable body 3 can be prevented effectively.

Figure 8:
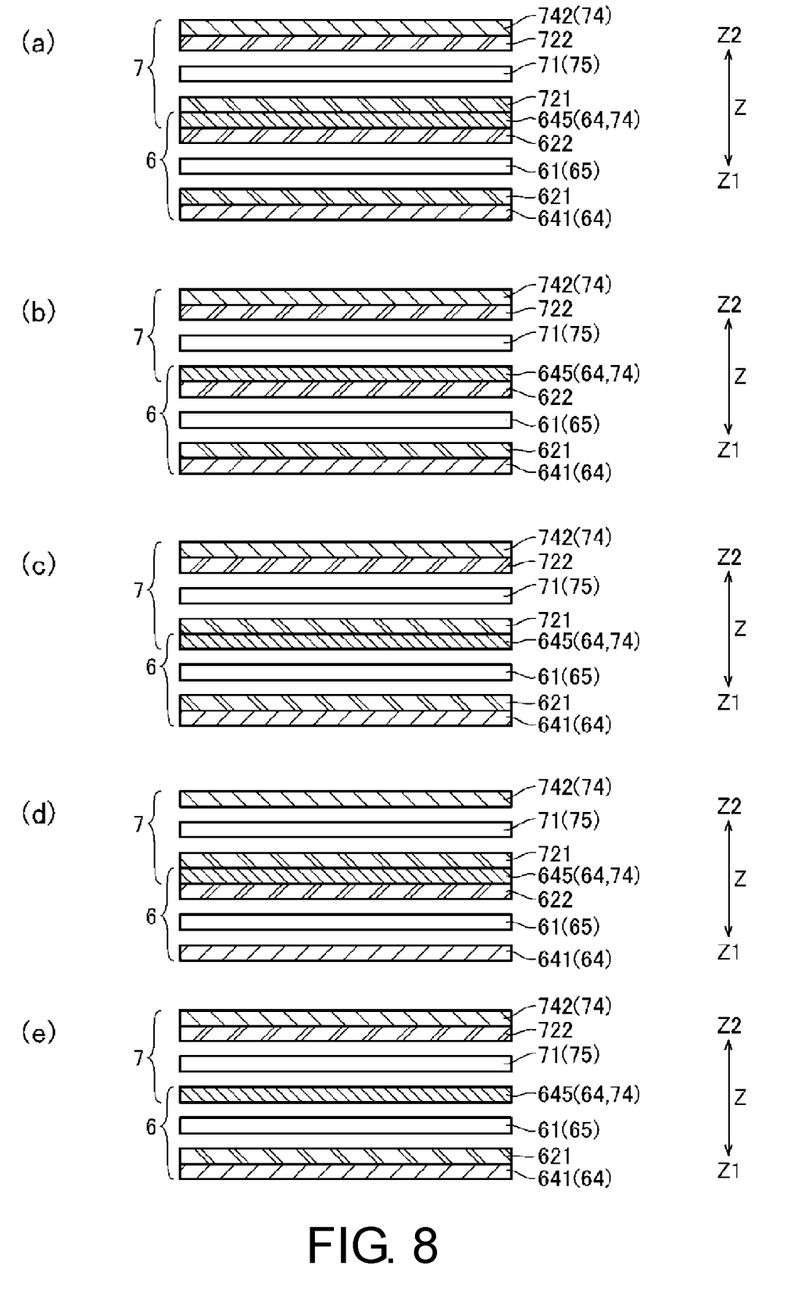

(Modified Examples of First Magnetic Drive Circuit 6 and Second Magnetic Drive Circuit 7) (a) through (e) of FIG. 8 are explanatory views schematically showing modified examples of a magnetic drive circuit which is used in the actuator 1 to which the present invention is applied. (a), (b), (c) and (d) of FIG. 8) show a first modified example, a second modified example, a third modified example and a forth modified example.

In the embodiment described above, from one side "Z1" in the "Z" direction toward the other side "Z2", the yoke plate 641 (first yoke 64), the first magnet 621, the first coil 61 (first coil holder 65), the first magnet 622, the yoke plate 642 (first yoke 64), the yoke plate 741 (second yoke 74), the second magnet 721, the second coil 71 (second coil holder 75), the second magnet 722 and the yoke plate 742 (second yoke 74) are successively disposed in this order to structure the first magnetic drive circuit 6 and the second magnetic drive circuit 7. However, the first magnetic drive circuit 6 and the second magnetic drive circuit 7 may be structured as the structures shown in (a) through (e) of FIG. 8.

For example, in the example shown in (a) of FIG. 8, from one side "Z1" in the "Z" direction toward the other side "Z2", the yoke plate 641 (first yoke 64), the first magnet 621, the first coil 61 (first coil holder 65), the first magnet 622, a yoke plate 645 (first yoke 64 and second yoke 74), the second magnet 721, the second coil 71 (second coil holder 75), the second magnet 722 and the yoke plate 742 (second yoke 74) are successively disposed in this order. Therefore, the first magnetic drive circuit 6 is structured of the yoke plate 641, the first magnet 621, the first coil 61, the first magnet 622 and the yoke plate 645, and the second magnetic drive circuit 7 is structured of the yoke plate 645, the second magnet 721, the second coil 71, the second magnet 722 and the yoke plate 742.

In the example shown in (b) of FIG. 8, from one side "Z1" in the "Z" direction toward the other side "Z2", the yoke plate 641 (first yoke 64), the first magnet 621, the first coil 61 (first coil holder 65), the first magnet 622, the yoke plate 645 (first yoke 64 and second yoke 74), the second coil 71 (second coil holder 75), the second magnet 722 and the yoke plate 742 (second yoke 74) are successively disposed in this order. Therefore, the first magnetic drive circuit 6 is structured of the yoke plate 641, the first magnet 621, the first coil 61, the first magnet 622 and the yoke plate 645, and the second magnetic drive circuit 7 is structured of the yoke plate 645, the second coil 71, the second magnet 722 and the yoke plate 742.

In the example shown in (c) of FIG. 8, from one side "Z1" in the "Z" direction toward the other side "Z2", the yoke plate 641 (first yoke 64), the first magnet 621, the first coil 61 (first coil holder 65), the yoke plate 645 (first yoke 64 and second yoke 74), the second magnet 721, the second coil 71 (second coil holder 75), the second magnet 722 and the yoke plate 742 (second yoke 74) are successively disposed in this order. Therefore, the first magnetic drive circuit 6 is structured of the yoke plate 641, the first magnet 621, the first coil 61 and the yoke plate 645, and the second magnetic drive circuit 7 is structured of the yoke plate 645, the second magnet 721, the second coil 71, the second magnet 722 and the yoke plate 742.

In the example shown in (d) of FIG. 8, from one side "Z1" in the "Z" direction toward the other side "Z2", the yoke plate 641 (first yoke 64), the first coil 61 (first coil holder 65), the first magnet 622, the yoke plate 645 (first yoke 64 and second yoke 74), the second magnet 721, the second coil 71 (second coil holder 75) and the yoke plate 742 (second yoke 74) are successively disposed in this order. Therefore, the first magnetic drive circuit 6 is structured of the yoke plate 641, the first coil 61, the first magnet 622 and the yoke plate 645, and the second magnetic drive circuit 7 is structured of the yoke plate 645, the second magnet 721, the second coil 71 and the yoke plate 742.

In the example shown in (e) of FIG. 8, from one side "Z1" in the "Z" direction toward the other side "Z2", the yoke plate 641 (first yoke 64), the first magnet 621, the first coil 61 (first coil holder 65), the yoke plate 645 (first yoke 64 and second yoke 74), the second coil 71 (second coil holder 75), the second magnet 722 and the yoke plate 742 (second yoke 74) are successively disposed in this order. Therefore, the first magnetic drive circuit 6 is structured of the yoke plate 641, the first magnet 621, the first coil 61 and the yoke plate 645, and the second magnetic drive circuit 7 is structured of the yoke plate 645, the second coil 71, the second magnet 722 and the yoke plate 742.

According to the examples as described above, one yoke plate 645 (yoke) is disposed between the first coil 61 and the second coil 71, and the yoke plate 645 functions as the first yoke 64 of the first magnetic drive circuit 6 and the second yoke 74 of the second magnetic drive circuit 7. Therefore, a size (thickness) in the first direction of the actuator can be reduced. Further, in the examples shown in (b), (c), (d) and (e) of FIG. 8, the number of magnets is reduced and thus the size (thickness) in the first direction of the actuator can be further reduced.

Further, in the example shown in (e) of FIG. 8, the first magnet 621 is disposed only on an opposite side to the second coil 71 with respect to the first coil 61, and the second magnet 722 is disposed only on an opposite side to the first coil 61 with respect to the second coil 71. Therefore, the magnetic center position (drive center) of the first magnetic drive circuit 6 and the magnetic center (drive center) of the second magnetic drive circuit 7 are approached each other in the "Z" direction and are in close proximity to the center of gravity of the movable body 3. Therefore, when the movable body 3 is driven in the "X" direction and the "Y" direction, the movable body 3 can be restrained from being inclined.

Other Embodiments

In the embodiment described above, the elastic member 4 (viscoelastic member) is disposed on both sides in the "Z" direction of the movable body 3. However, the elastic member 4 (viscoelastic member) may be disposed on both sides in the "X" direction of the movable body 3 and on both sides in the "Y" direction of the movable body 3. Further, in the embodiment described above, a gel damper member is used as the elastic member 4, but rubber, a spring or the like may be used as the elastic member 4. A gel member (gel damper member) is, for example, silicone-based gel. More specifically, silicone-based gel having a penetration degree in a range of 10 degrees to 110 degrees can be used as the elastic member 4. A penetration degree is defined in JIS-K-2207 and JIS-K-2220 and means that the silicone-based gel is harder as the value is smaller.

Further, viscoelasticity is a property provided with both of viscosity and elasticity and is remarkably found in high molecular material such as gel member, plastic and rubber. Therefore, as the elastic member 4 provided with viscoelasticity, various rubber materials such as natural rubber, diene-based rubber (for example, styrene butadiene rubber, isoprene rubber, butadiene rubber, chloroprene rubber, acrylonitrile butadiene rubber), non-diene-based rubber (for example, butyl rubber, ethylene propylene rubber, ethylene propylene diene rubber, urethane rubber, silicone rubber, fluorine-containing rubber, and the like) and thermoplastic elastomer, and their denatured materials may be used.

Further, in the embodiment described above, when both sides in the "Z" direction of the first elastic member 41 are respectively to be connected with the movable body 3 and the first end plate 28 by adhesion and, when both sides in the "Z" direction of the second elastic member 42 are respectively to be connected with the movable body 3 and the second end plate 29 by adhesion, the elastic member 4 (first elastic member 41 and second elastic member 42) are set in a compressed state between the support body 2 and the movable body 3 in the "Z" direction. Therefore, the elastic member 4 surely follows movement of the movable body 3 and thus, resonance of the movable body 3 can be prevented effectively.

In the embodiment described above, the coil and the coil holder are provided in the support body 2, and the magnet and the yoke are provided in the movable body 3. However, the present invention may be applied to a case that a coil and a coil holder are provided in the movable body 3 and a magnet and a yoke are provided in the support body 2.

INDUSTRIAL APPLICABILITY

In the present invention, a first magnetic drive circuit which vibrates the movable body in the second direction and a second magnetic drive circuit which vibrates the movable body in the third direction are provided and thus, the movable body can be vibrated in the second direction and the third direction. Therefore, a user is capable of feeling bodily sensation of vibration in the second direction, vibration in the third direction and vibration combined of the vibration in the second direction with the vibration in the third direction. Further, the first magnetic drive circuit and the second magnetic drive circuit are disposed in an overlapped state in the first direction and thus, a size (plane area) when the actuator is viewed in the first direction is small. Therefore, the actuator to which the present invention is applied is suitable to be mounted on an apparatus such as a controller held in a hand. Further, the drive mechanism is structured of the first magnetic drive circuit and the second magnetic drive circuit and thus, a size (thickness) in the first direction of the actuator can be reduced.

What is claimed is:
1. An actuator comprising:
a support body;
a movable body which is movable with respect to the support body; and
a drive mechanism structured to drive the movable body;
wherein the drive mechanism comprises:
a first magnetic drive circuit which comprises a first coil and a first magnet facing each other in a first direction and is structured to drive the movable body in a second direction perpendicular to the first direction;
a second magnetic drive circuit which comprises a second coil and a second magnet facing each other in the first direction at a position overlapping with the first magnetic drive circuit in the first direction, the second magnetic drive circuit being structured to drive the movable body in a third direction perpendicular to the first direction and intersecting the second direction,
wherein the actuator further comprising a first coil holder which holds the first coil and a second coil holder which holds the second coil,
the first coil holder and the second coil holder are disposed so as to be overlapped with each other in the first direction and are connected with each other,
the first magnet faces in the first direction a first effective side portion of the first coil extended in the third direction,
the second magnet faces in the first direction a second effective side portion of the second coil extended in the second direction,
the first coil holder comprises a first stopper part which faces the first magnet in the third direction to restrict a movable range in the third direction of the movable body, and
the second coil holder comprises a second stopper part which faces the second magnet in the second direction to restrict a movable range in the second direction of the movable body.

2. The actuator according to claim 1, wherein
the first coil holder comprises:
a first frame part which holds the first coil on an inner side; and
a plurality of first pillar shaped parts which are protruded in the first direction from end parts of the first frame part,
the second coil holder comprises:
a second frame part which holds the second coil on an inner side; and
a plurality of second pillar shaped parts which are protruded in the first direction from end parts of the second frame part, and
the plurality of the first pillar shaped parts and the plurality of the second pillar shaped parts are connected with each other.

3. The actuator according to claim 1, further comprising a plurality of yokes which are disposed on one side in the first direction with respect to the first coil, between the first coil and the second coil, and on an other side in the first direction with respect to the second coil,
wherein the first magnet and the second magnet are held by either of the plurality of the yokes.

4. The actuator according to claim 3, wherein one of the yokes is disposed between the first coil and the second coil.

5. The actuator according to claim 4, wherein
the first magnet is disposed on an opposite side to the second coil with respect to the first coil, and
the second magnet is disposed on an opposite side to the first coil with respect to the second coil.

6. The actuator according to claim 1, wherein
the first coil and the second coil are provided on a side of the support body, and
the first magnet and the second magnet are provided on a side of the movable body.

7. The actuator according to claim 1, wherein an elastic member having elasticity or viscoelasticity is disposed in a portion where the movable body and the support body face each other in the first direction.

8. The actuator according to claim 7, wherein the elastic member is disposed as:
a first elastic member which is contacted with both of the movable body and a portion of the support body facing the movable body on one side in the first direction; and
a second elastic member which is contacted with both of the movable body and a portion of the support body facing the movable body on an other side in the first direction.

9. The actuator according to claim 8, wherein the elastic member is adhesively bonded to the support body and the movable body on each of the one side in the first direction with respect to the movable body and the other side in the first direction with respect to the movable body.

10. The actuator according to claim 9, wherein the elastic member is provided in a compressed state in the first direction between the support body and the movable body on each of the one side in the first direction with respect to the movable body and the other side in the first direction with respect to the movable body.

11. The actuator according to claim 10, wherein the elastic member is a viscoelastic member.

12. The actuator according to claim 11, wherein the viscoelastic member is a gel member.

13. The actuator according to claim 12, wherein the gel member is silicone-based gel.

14. The actuator according to claim 2, further comprising a plurality of yokes which are disposed on one side in the first direction with respect to the first coil, between the first coil and the second coil, and on an other side in the first direction with respect to the second coil,
wherein the first magnet and the second magnet are held by either of the plurality of the yokes.

15. The actuator according to claim 14, wherein one of the yokes is disposed between the first coil and the second coil.

16. The actuator according to claim 15, wherein
the first magnet is disposed on an opposite side to the second coil with respect to the first coil, and
the second magnet is disposed on an opposite side to the first coil with respect to the second coil.

* * * * *